US011459159B2

(12) United States Patent
Backfolk et al.

(10) Patent No.: US 11,459,159 B2
(45) Date of Patent: Oct. 4, 2022

(54) ETHYLENE SCAVENGING MATERIAL SUITABLE FOR USE IN PACKAGES

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI); Seppo Lampainen, Lahti (FI); Simo Siitonen, Rautjärvi (FI); Marianne Andersson, Stockholm (SE)

(73) Assignee: Stora Enso OYJ, Helsinki (FI)

( * ) Notice: Subject to any disclaimer, the term of this patent is extended or adjusted under 35 U.S.C. 154(b) by 820 days.

(21) Appl. No.: 16/316,729

(22) PCT Filed: Jul. 3, 2017

(86) PCT No.: PCT/IB2017/054004
§ 371 (c)(1),
(2) Date: Jan. 10, 2019

(87) PCT Pub. No.: WO2018/011666
PCT Pub. Date: Jan. 18, 2018

(65) Prior Publication Data
US 2019/0291938 A1    Sep. 26, 2019

(30) Foreign Application Priority Data

Jul. 11, 2016  (SE) .................................. 1651029-9

(51) Int. Cl.
| | |
|---|---|
| *B65D 81/26* | (2006.01) |
| *A23B 7/157* | (2006.01) |
| *A23L 3/358* | (2006.01) |
| *B01J 20/02* | (2006.01) |
| *B01J 20/28* | (2006.01) |
| *B01J 20/30* | (2006.01) |
| *B01J 20/32* | (2006.01) |
| *B65D 65/42* | (2006.01) |
| *C08L 1/02* | (2006.01) |
| *D21H 19/02* | (2006.01) |
| *D21H 21/22* | (2006.01) |
| *D21H 11/18* | (2006.01) |
| *C08B 15/08* | (2006.01) |
| *D21H 27/10* | (2006.01) |
| *A23B 7/14* | (2006.01) |
| *B01J 20/26* | (2006.01) |
| *B01J 20/24* | (2006.01) |
| *A23L 3/34* | (2006.01) |

(52) U.S. Cl.
CPC ............. *B65D 81/266* (2013.01); *A23B 7/14* (2013.01); *A23B 7/157* (2013.01); *A23L 3/34* (2013.01); *A23L 3/358* (2013.01); *B01J 20/0225* (2013.01); *B01J 20/24* (2013.01); *B01J 20/262* (2013.01); *B01J 20/28007* (2013.01); *B01J 20/28023* (2013.01); *B01J 20/3021* (2013.01); *B01J 20/3212* (2013.01); *B01J 20/3236* (2013.01); *B65D 65/42* (2013.01); *B65D 81/26* (2013.01); *C08B 15/08* (2013.01); *C08L 1/02* (2013.01); *D21H 11/18* (2013.01); *D21H 19/02* (2013.01); *D21H 21/22* (2013.01); *D21H 27/10* (2013.01); *A23V 2002/00* (2013.01); *C08L 2201/14* (2013.01); *C08L 2203/16* (2013.01); *C08L 2205/16* (2013.01)

(58) Field of Classification Search
CPC ...... B65D 81/26; B65D 81/266; B65D 65/42; A23B 7/14; A23B 7/157; A23L 3/34; A23L 3/358; B01J 20/0225; B01J 20/24; B01J 20/262; B01J 20/28007; B01J 20/28023; B01J 20/3021; B01J 20/3212; B01J 20/3236; C08B 15/08; C08L 1/02; C08L 2203/16; C08L 2205/16; D21H 11/18; D21H 19/02; D21H 21/22; D21H 7/10; A23V 2002/00
USPC ........................................................ 502/402
See application file for complete search history.

(56) References Cited

U.S. PATENT DOCUMENTS

| | | | |
|---|---|---|---|
| 5,979,653 | A | 11/1999 | Owens et al. |
| 2014/0302336 | A1 | 10/2014 | Heiskanen et al. |

FOREIGN PATENT DOCUMENTS

| | | |
|---|---|---|
| EP | 0515764 | 2/1992 |
| EP | 0938925 | 9/1999 |
| EP | 1867382 | 12/2007 |
| EP | 2236545 | 10/2010 |
| JP | H02242767 | 9/1990 |
| JP | H11314308 A | 11/1999 |
| JP | 2012007247 | 1/2012 |
| JP | 2014530946 A | 11/2014 |
| WO | 2005000369 | 1/2005 |
| WO | 2007052074 | 5/2007 |
| WO | 2013061266 | 5/2013 |
| WO | 2014153210 | 9/2014 |

OTHER PUBLICATIONS

International Searching Authority, Written Opinion of the International Searching Authority, PCT/IB2017/054004, dated Sep. 15, 2017.
International Searching Authority, International Search Report, PCT/IB2017/054004, dated Sep. 15, 2017.
Keshavarzi, N., et al. "Nanocellulose-Zeolite Composite Films for Odor Elimination," ACS Appl. Mater. Interfaces, Jun. 2015, vol. 7, pp. 14254-14262, DOI: 10.1021 /acsami.5b02252; abstract, p. 14255 "materials", p. 14256 "preparation of dispersions and films", figure 1.

(Continued)

*Primary Examiner* — Edward M Johnson
(74) *Attorney, Agent, or Firm* — Greer, Burns & Crain, Ltd.

(57) ABSTRACT

The present invention relates to a material suitable for use in packages comprising nano-sized cellulose and an ethylene scavenging or ethylene absorbing agent. The invention also relates to methods for manufacturing such material, which may be paper, label, paperboard, plastic or film products.

11 Claims, No Drawings

(56) References Cited

OTHER PUBLICATIONS

Vermeiren, L., et al., "Developments in the active packaging of Foods," Trends in Food Science & Technology, 1999, vol. 10, pp. 77-86, DOI: 10.1016/80924-2244(99)00032-1; p. 79-80 "ethylene scavengers".

Sothornvit, R., et al., "Rice straw paper incorporated with activated carbon as an ethylene scavenger in a paper-making process," 2012, vol. 47, pp. 511-517, DOI: 1 0.1111/j.1365-2621.2011.02871.x; abstract, p. 512 left column, p. 514 left column, figure 6.

Lapidus, A.L. et al. "Catalytic properties of Pd-zeolites in ethylene oligomerization" In: Acta physica et chemica, 1978, vol. 24, pp. 195-199, ISSN: 0001-6721; abstract.

ETHYLENE SCAVENGING MATERIAL SUITABLE FOR USE IN PACKAGES

This application is a U.S. National Phase under 35 U.S.C. § 371 of International Application No. PCT/IB2017/054004, filed Jul. 3, 2017, which claims priority under 35 U.S.C. §§ 119 and 365 to Swedish Application No. 1651029-9, filed Jul. 11, 2016.

TECHNICAL FIELD

The present invention relates to a material suitable for use in packages comprising nano-sized cellulose and an ethylene scavenging or ethylene absorbing agent. The invention also relates to methods for manufacturing such material, which may be paper, label, paperboard, plastic or film products.

BACKGROUND

Food and food products, including packaged foods and food products, are generally subject to two main problems: microbial contamination and quality deterioration.

As some produces such as fruits and vegetables ripen, they release ethylene, a gas that accelerates ripening, causing fruit and vegetables become spotted and soft and decay. In addition to changed texture, the taste, odor or nutrient behavior of the produce might change. Ethylene-related problems cause a large part of post-harvest losses in developing countries.

There are various methods and products in the art, for preserving food material from negative effects of ethylene gas. The use of modified atmosphere or storage at lower temperature is often used although these might have a negative effect on at least some of the organoleptic behaviors of the produces. A method to introduce ethylene scavenging properties involves using potassium permanganate as an ethylene oxidizing agent as disclosed in WO 2005/000369 A1 and EP 0 515 764 A2. Potassium permanganate is incorporated into absorbent materials having high surface area such as alumina, silica, clay and activated carbon. However potassium permanganate is prohibited in Europe and limited latitude exists in the U.S. as far as the absorbent material is stored in sacs because of the toxicity of potassium permanganate. Incorporating different functional minerals into polymeric films, on the other hand is also well known and such products are already available in the market.

JP2242767 discloses a bag made of plastic film having defined air permeability and a waterproofness of at least 30 mm and containing fresh vegetables and another film bag containing a gas adsorbent placed together in a corrugated fiberboard box, preferably in the box provided with a barrier in the central groove of its corrugated surface. The plastic film may have dispersed therein a powder of a porous substance consisting of open cell or fine cellulose fibers.

Many of the methods known in the art are based on absorbents including a ethylene gas decomposing agent or catalyst. The existing solutions have been tested on various films, papers and carton board packaging solutions etc.

One problem with the existing solutions is the limited amount of available surface area. The use of nanomaterials often require a high amount of binders or retention chemicals, or must be added via coating. Another problem is that often the maximum amount of added material is restricted since it affects e.g. the strength or barrier properties of the material concerned. For example, in polyethylene plastics, higher amounts of absorbents or carrier particles will affect the strength properties and hence the convertability of the material. Therefore, the amount of ethylene scavenger that can be added with maintained mechanical properties of the material is often insufficient to obtain the desired anti-ripening effects on the packaged fruits or vegetables.

There is thus a need for improved products for packaging, particularly products that can help address the issues related to quality deterioration of packaged food.

SUMMARY OF THE INVENTION

It has surprisingly been found that by incorporating nano-sized cellulose in a material suitable for use in packages, said material comprising an ethylene scavenging or ethylene absorbing agent, some of the problems described above can be overcome.

The term nano-sized cellulose as used herein encompasses microfibrillated cellulose (MFC) and nanocrystalline cellulose.

The material suitable for use in packages can be paper, a label, paperboard, plastic or a film or a coating.

In one embodiment of the present invention, the ethylene scavenging or ethylene absorbing agent is incorporated into the material, i.e. the ethylene scavenging or ethylene absorbing agent is present at the time of manufacturing or preparing the nano-sized cellulose or is mixed with the nano-sized cellulose prior to forming a film or web.

The material which comprises an ethylene scavenging agent and/or ethylene absorbing agent and nano-sized cellulose, can also be applied with a coating or printing process, either each component separately or together.

In another embodiment of the present invention, the ethylene scavenging or ethylene absorbing agent is incorporated into the material suitable for use in packages, by coating or impregnation.

One embodiment of the present invention is a coating for use in or on the material suitable for use in packages, that comprises nano-sized cellulose and an ethylene scavenging and/or ethylene absorbing agent. The coating would typically comprise at least 1 $g/m^2$, preferably at least 5 $g/m^2$, more preferably at least 10 $g/m^2$ ethylene scavenging and/or ethylene absorbing agent.

The material according to the present invention typically comprises at least 1% of nano-sized cellulose, preferably at least 5% of nano-sized cellulose, more preferably at least 10% nano-sized cellulose.

In one embodiment of the present invention, the material according to the present invention comprises from 0.05 to 50 weight-% ethylene scavenging and/or ethylene absorbing agent, preferably from 0.1 to 20 weight-%.

It is also possible to modify the nano-sized cellulose with e.g. inorganic catalysts through chemical vapor deposition or atomic layer deposition methods. In this case, it is preferably that the nano-sized cellulose material has a relatively high surface area which can be exposed to the deposition of the inorganic chemical.

One aspect of the invention is a paper, label, paperboard, plastic or film product comprising, coated with or impregnated with nano-sized cellulose and an ethylene scavenging or ethylene absorbing agent. The film can be made from a plastic material, biopolymer or cellulose or cellulose fibrils, regenerated cellulose, bioplastic etc. The product can be a rigid packaging product or a flexible package such as a bag.

The final package prepared using a material according to the present invention may have by multiple layers of said paper, board or film according to the present invention. The layers may be laminated together. In one embodiment of the present invention, the ethylene scavenging agent or ethylene absorbing agent is present in the final package in the form of a label on which a top coating is optionally arranged. The top coating may comprise an adhesive on one side such that the top coating can be removed, such as being peeled off, thereby exposing and activating the ethylene scavenging agent or ethylene absorbing agent. Said top coating may be sensitive to humidity and/or moisture so that the top coating may loose its gas barrier properties at increased humidity or moisture, thereby exposing and activating the ethylene scavenging agent or ethylene absorbing agent. In one embodiment of the present invention, this may be achieved by using a top coating that comprises nano-sized cellulose, such as microfibrillated cellulose. Thus the ethylene scavenging or ethylene absorbing agent may initially be encapsulated but upon removal of the encapsulation the ethylene scavenging or ethylene absorbing agent becomes exposed and activated.

In one embodiment of the present invention, the material suitable for use in packages has a high surface area and preferably high ethylene, $CO_2$ and $O_2$ permeability, which can be achieved by using absorbents, but also by using e.g. alcohol or debonding agents or by microflocculating the nano-sized cellulose.

In one embodiment of the present invention, the material suitable for use in packages is thin, preferably <50 gsm ($g/m^2$), more preferably <30 gsm. In another embodiment, the material is thicker, such as more than 50 gsm or more than 100 gsm.

In one embodiment of the present invention, the gas permeability of the material suitable for use in packages is >50 $cm^3/m^2$/day determined at 50% relative humidity and at 23° C. for a film with a thickness of 30 μm. In one embodiment, the gas permeation as determined by the OTR value is >500, preferably >1000.

In one embodiment of the present invention, the material suitable for use in packages has a high content of ethylene absorbing agent, preferably >10 wt % more preferably >30 wt %.

In one embodiment of the present invention, the ethylene scavenging agent or ethylene absorbing agent can be dosed to the wet end of a process for manufacturing a paper, label, or paperboard product or may be added to the by surface sizing, impregnation, coating or via printing. Alternatively, a microfibrillated cellulose film may be functionalized through the use of atomic layer deposition (ALD) or chemical vapor deposition or similar methods.

In one embodiment of the present invention, the nano-sized cellulose, such as microfibrillated cellulose in the material suitable for use in packages should have SR>70, more preferably >80. SR denotes the Schopper Riegler number which can be achieved as well as determined using methods known in the art.

In one embodiment of the present invention, the web used in the preparation of the material suitable for use in packages may also contain long fibers, e.g. <30% kraft fiber or more preferably <20% kraft fiber.

In one embodiment of the present invention, the material suitable for use in packages has a high surface area, preferably BET >100 $m^2/g$, most preferably >200 $m^2/g$.

DETAILED DESCRIPTION

The ethylene scavenging agent used in the present invention can for example be selected from potassium permanganate, iodic acid or potassium bromate on charcoal, potassium bromate and sulfuric acid, bromine liquids, silver oxide, rare earth oxide, phosphate compounds, chlorate compounds, ferrocyanin compounds, hypochlorite, hypochlorite salt and bromide or iodide salts, chlorate, a chlorite, a certain metal and a metallic oxide, K permanganate, ascorbic acid, sodium citrate and water, peroxide, sodium permanganate (which may need a carrier such as a zeolite), periodic acid, calcium permanganate or potassium iodate, potassium peroxymanganate, tobermorite and silver, xonotlite and silver, Ferrous sulfate heptahydrate and calcium hydroxide, brominated carbonaceous molecular sieves, hydrogen bromide and bromine adduct of vinyl pyridine resin, bromine-added vinylquinoline-type resin, calcium hypochlorite, sodium hypochlorite, potassium hypochlorite, and magnesium hypochlorite. Catalytic chemicals that function as ethylene scavenging agents include ammonium molybdate containing palladium sulphate catalyst (for detection), electron-deficient diene or triene incorporated in an ethylene-permeable substrate (benzene, pyridine, diazine, triazine or tetrazine having electron-withdrawing substituents, preferably a fluoroalkyl group, sulphone group and/or ester group, the ester group being dicarboxylated or dicarboxymethylated), hydrophobic (hydrosilylation) catalyst with e.g. Pt, high-molecular complex made by coordination of CuCl and $AlCl_3$, Ti—, Al—, Ni or Fe-oxide, palladium cpd. adsorbed on carbon black, metal oxide e.g. alumina and metal e.g. platinum, cyclodextrin and PEI, active carbon treated with palladium chloride, palladium doped Zeolite Socony Mobil (ZSM)-5, or a photosensitive agent obtaining its ethylene scavenging properties after exposure to light, such as UV light or sunlight.

In one embodiment of the present invention, the ethylene scavenging agent is a catalyst or catalytic chemical, such as a platinum-containing or palladium-containing catalyst.

The catalyst can be prepared using methods known in the art. The catalyst can be in the form of a catalyst-doped zeolite or using another absorbent than a zeolite. The catalyst, such as a platinum-containing or palladium-containing catalyst may also be present in the material suitable for use in packages in the absence of zeolite.

In one embodiment of the present invention, the ethylene scavenging agent is a platinum-containing or palladium-containing catalyst or a high-molecular complex made by coordination of CuCl and/or $AlCl_3$.

In one embodiment of the present invention, the nano-sized cellulose is MFC.

The material suitable for use in packages can also made with a so called cast process. The suspension of MFC or fine cellulose is deposited on a carrier substrate, semipermeable or non-permeable, with or without the ethylene scavenging agent or ethylene absorbing agent (for example a catalyst or its precursors). Drying is then made in order to produce the free standing film or intermediate product thereof. One option is to dose the ethylene scavenging agent or ethylene absorbing agent in a second step through any of the mentioned surface treatment steps. The cast coating is also more suitable for solvent based process.

The material can further be modified with additives such as low molecular carbohydrates, such as hemicellulose sorbitol etc., which are sensitive to water and moisture, i.e. allows the structure to swell.

One aspect of the present invention is a microfibrillated cellulose film into which an ethylene scavenging agent in the form of a catalyst, such as a platinum-containing or palladium-containing catalyst has been absorbed.

The ethylene absorbing agent used in the present invention can for example be selected from charcoal, zeolites, silica, modified silica, aluminium oxide, al-silicates, sepolite, montmorillonite, bentonite, travertite or permutite, cristobalite, viscid ore, clay, coral, rape oil, carbon fiber, feldspathic porphyritic andesite, carbon nanoparticle, vermiculite, germanium, attapulgite, graphite, humus, pearlite, brickblock, tobermorite and organic resins.

In one embodiment of the present invention, the ethylene scavenging or ethylene absorbing agent is incorporated into the material suitable for use in packages. In this embodiment the ethylene scavenging or ethylene absorbing agent is present at the time of preparing the microfibrillated cellulose or is mixed with the microfibrillated cellulose prior to forming a web. This embodiment includes a process for producing a dispersion comprising microfibrillated cellulose and an ethylene scavenging or ethylene absorbing agent wherein the process comprises the steps of providing a slurry comprising optionally pre-treated cellulose fibers, adding an ethylene scavenging or ethylene absorbing agent to the slurry and treating the slurry by mechanical disintegration so that a dispersion comprising microfibrillated cellulose is formed in which the ethylene scavenging or ethylene absorbing agent is being absorbed to the surface of the microfibrillated cellulose. By treating a slurry comprising optionally pre-treated cellulose fibers and an ethylene scavenging or ethylene absorbing agent by mechanical disintegration it is possible to produce a stable dispersion.

The mechanical disintegration is preferably done in a pressure homogenizer. It has been shown that by using a pressure homogenizer it is possible to produce microfibrillated cellulose with more open areas and at the same time disperse the ethylene scavenging or ethylene absorbing agent of the dispersion in a very efficient way.

The pressure used in the pressure homogenizer is preferably between 500-4000 Bar, more preferably between 1000-2000 Bar. The fiber or intermediate product can be fibrilled one or several times either with or without process additives such as stabilizing agents or ethylene scavengers or precursors thereof.

The weight ratio between the microfibrillated cellulose and ethylene scavenging or ethylene absorbing agent of the dispersion is preferably between 10:90 to 90:10. Depending on what kind of microfibrillated cellulose and an ethylene scavenging or ethylene absorbing agent the dispersion comprises, the ratio can vary.

It is preferred that a proportion of the ethylene scavenging or ethylene absorbing agent of the dispersion is being absorbed on the surface of or into the microfibrillated cellulose.

The dry content of the slurry to be treated by mechanical disintegration is preferably between 0.05-30% by weight of fibers. The dry content of the slurry depends on the ethylene scavenging or ethylene absorbing agent used, what kind of MFC used as well as what kind of apparatus is used for the mechanical disintegration.

The dry content of the dispersion after it has been treated by the mechanical disintegration is preferably above 50% by weight of fibers. The dispersion is preferably dewatered after the mechanical disintegration in order to increase the dry content. By increasing the dry content, transportation of the dispersion to other sites can be done a more efficient way. Furthermore, it has been shown that by increasing the dry content of the dispersion the stability is even further increased.

In one embodiment, the process may further comprise washing of the dispersion after the mechanical disintegration. In this way it is possible to remove any free ethylene scavenging or ethylene absorbing agent from the dispersion.

The mechanical disintegration can be done in many different kinds of mechanical treatment apparatus, for example refiners or grinders such as Masuko grinders or refiners or grinders used to manufacture MFC disclosed in the prior art. However, it is preferred to use a pressure homogenizer which in a very efficient way both will produce microfibrillated cellulose fibers from pre-treated fibers as well as potentially homogenize the ethylene scavenging or ethylene absorbing agent. A high pressure is used during mechanical disintegration, and the pressure is preferably between 500-4000 Bar, preferably between 1000-2000 Bar. The optimal pressure is often around 1500 Bar. The pressure needed depends on the material being treated. However, too high pressures are often not beneficial to use since the wear of the equipment will be too high. One example of a specific pressure homogenizer is the so called microfluidizer.

In one embodiment of the present invention, a base film is formed in a paper making machine or according to a wet laid production method, by providing a suspension or dispersion as described above onto a wire and dewatering the web to form an intermediate thin substrate or said base film. A suspension or dispersion comprising microfibrillated cellulose as described above is provided to form said base film. The suspension or dispersion may be entirely aqueous or also contain other solvents than water such as alcohols, such as for example a co-solvent mixture of water and ethanol.

In one embodiment of the present invention, foam forming or foam coating is used in the manufacture of the material according to the present invention.

The microfibrillated cellulose content of the suspension or dispersion may, according to one embodiment be in the range of from 60 to 99.9 weight-% based on the weight of solids of the suspension or dispersion. In one embodiment, the microfibrillated cellulose content of the suspension or dispersion may be in the range of 70 to 99 weight-%, in the range of 70 to 95 weight-%, or in the range of from 75 to 90 weight-%.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

According to another embodiment, the suspension or dispersion may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension or dispersion may also comprise other process or functional additives, such as fillers, pigments, wet strength chemicals, dry strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc. Additives can also be added using a size press or a printing machine.

The papermaking machine that may be used in the in the manufacture of a material according to the present invention may be any conventional type of machine known to the skilled person used for the production of paper, paperboard, tissue or similar products.

Subsequent to the wet web being placed onto the wire, it is dewatered. The dewatering on wire may, according to one embodiment be performed by using known techniques with single wire or twin wire system, frictionless dewatering, membrane-assisted dewatering, vacuum- or ultrasound assisted dewatering, etc. After the wire section, the wet web is further dewatered and dried by mechanical pressing including shoe press, hot air, radiation drying, convection drying, etc. The film might also be dried or smoothened by soft or hard nip (or various combinations) calenders etc.

According to one embodiment the wet web is dewatered by vacuum, i.e. water, and other liquids, is sucked from the furnish when it is placed on the wire.

In view of the above detailed description of the present invention, other modifications and variations will become apparent to those skilled in the art. However, it should be apparent that such other modifications and variations may be effected without departing from the spirit and scope of the invention.

The invention claimed is:

1. A material suitable for use in packages comprising nano-sized cellulose and an ethylene scavenging and/or ethylene absorbing agent,
wherein the ethylene scavenging agent and/or ethylene absorbing agent is present in the form of a label on which a top coating is arranged and wherein the ethylene scavenging agent and/or ethylene absorbing agent can be exposed by an increase ii moisture or humidity which dissolves the top coating or by removal of the top coating covering the ethylene scavenging agent and/or ethylene absorbing agent.

2. A material suitable for use in packages according to claim 1, wherein said material is or comprises a paper, label, film or paperboard or plastic product.

3. A material suitable for use in packages according to claim 1, wherein the ethylene scavenging agent is a catalyst.

4. A material according to claim 1, wherein the material is a coating or is printed on a surface.

5. A material according to claim 1, wherein the ethylene scavenging agent and/or ethylene absorbing agent can be activated.

6. A material according to claim 1, wherein the ethylene scavenging agent and/or ethylene absorbing agent can be exposed by an increase in moisture or humidity which dissolves a protective coating or by removal of a top coating covering the ethylene scavenging agent and/or ethylene absorbing agent.

7. A material according to claim 1, wherein the nano-sized cellulose is microfibrillated cellulose.

8. A material suitable for use in packages according to claim 1, wherein the ethylene scavenging agent is a platinum-containing catalyst or palladium-containing catalyst.

9. A material suitable for use in packages according to claim 1, wherein the ethylene absorbing agent comprises charcoal, zeolites, silica, modified silica, aluminium oxide, al-silicates, sepolite, montmorillonite, bentonite, travertite or permutite, cristobalite, viscid ore, clay, coral, rape oil, carbon fiber, feldspathic porphyritic andesite, carbon nanoparticle, vermiculite, germanium, attapulgite, graphite, humus, pearlite, brickblock, tobermorite, and organic resins.

10. A material suitable for use in packages according to claim 1, wherein the ethylene scavenging agent comprises potassium permanganate, iodic acid or potassium bromate on charcoal, potassium bromate and sulfuric acid, bromine liquids, silver oxide, rare earth oxide, phosphate compounds, chlorate compounds, ferrocyanin compounds, hypochlorite, hypochlorite salt and bromide or iodide salts, chlorate, a chlorite, a certain metal and a metallic oxide, K permanganate, ascorbic acid, sodium citrate and water, peroxide, sodium permanganate, periodic acid, calcium permanganate or potassium iodate, potassium peroxymanganate, tobermorite and silver, xonotlite and silver, Ferrous sulfate heptahydrate and calcium hydroxide, brominated carbonaceous molecular sieves, hydrogen bromide and bromine adduct of vinyl pyridine resin, bromine-added vinylquinoline-type resin, calcium hypochlorite, sodium hypochlorite, potassium hypochlorite, magnesium hypochlorite, ammonium molybdate containing palladium sulphate catalyst, electron-deficient diene or triene incorporated in an ethylene-permeable substrate, hydrophobic catalyst with Pt, high-molecular complex made by coordination of CuCl and $AlCl_3$, Ti-, Al-, Ni or Fe-oxide, palladium compound adsorbed on carbon black, alumina and platinum, cyclodextrin and PEI, active carbon treated with palladium chloride, palladium doped ZSM-5, or a photosensitive agent.

11. A material suitable for use in packages according to claim 1, wherein the material suitable for use in packages comprises greater than 30 wt % of the ethylene absorbing agent.

* * * * *